United States Patent
Kim et al.

(10) Patent No.: US 12,251,988 B2
(45) Date of Patent: *Mar. 18, 2025

(54) INJECTION TYPE HEAT EXCHANGE MODULE AND HEAT MANAGEMENT SYSTEM FOR VEHICLE APPLYING THE SAME

(71) Applicants: HYUNDAI MOTOR COMPANY, Seoul (KR); KIA CORPORATION, Seoul (KR)

(72) Inventors: Jong Won Kim, Cheonan-si (KR); Sang Shin Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 315 days.

This patent is subject to a terminal disclaimer.

(21) Appl. No.: 17/946,261

(22) Filed: Sep. 16, 2022

(65) Prior Publication Data

US 2023/0182539 A1 Jun. 15, 2023

(30) Foreign Application Priority Data

Dec. 10, 2021 (KR) .................. 10-2021-0176839

(51) Int. Cl.
*B60H 1/32* (2006.01)
*B60H 1/00* (2006.01)

(52) U.S. Cl.
CPC ....... *B60H 1/3227* (2013.01); *B60H 1/00571* (2013.01); *B60H 1/00899* (2013.01); *B60H 2001/00942* (2013.01)

(58) Field of Classification Search
CPC ...... F25B 2600/2501; F25B 2600/2507; F25B 41/20; F25B 41/42; B60H 1/3227; B60H 1/00571; B60H 11/00899

See application file for complete search history.

(56) References Cited

U.S. PATENT DOCUMENTS

| | | |
|---|---|---|
| 5,692,394 A | 12/1997 | Ozaki et al. |
| 5,799,499 A | 9/1998 | Yano et al. |
| 6,298,687 B1 | 10/2001 | Dienhart et al. |
| 2017/0284715 A1* | 10/2017 | Mukherjee ............. F25B 40/00 |
| 2019/0070924 A1 | 3/2019 | Mancini et al. |
| 2019/0299126 A1 | 10/2019 | Osaki et al. |

* cited by examiner

*Primary Examiner* — Elizabeth J Martin
(74) *Attorney, Agent, or Firm* — MCDONNELL BOEHNEN HULBERT & BERGHOFF LLP

(57) ABSTRACT

An injection type heat exchange module includes an outer tank composed of an upper chamber and a lower chamber separated from each other, an inner tank disposed inside the upper chamber of the outer tank to be heat-exchangeable with the refrigerant and connected to discharge the refrigerant to the compressor, the evaporator, or the lower chamber of the outer tank, a first valve disposed on an upper end of the inner tank; a second valve rotatably coupled to a lower end of the inner tank, and an actuator simultaneously connected to the first valve and the second valve to be operated to simultaneously rotate the first valve and the second valve, and a heat management system for a vehicle applying the same.

13 Claims, 16 Drawing Sheets

FIG. 3

| ITEMS | Case | Upper End EXV1 (Gas inj) | Upper End Bypass | Lower End EXV2 | Lower End Bypass | Lower End EXV3 (Liquid inj) |
|---|---|---|---|---|---|---|
| Liquid injection | 1 | × | ○ | ○ | × | ○ |
| A/C expansion | 2 | × | ○ | × | × | ○ |
| Gas injection | 3 | ○ | × | ○ | × | × |
| – | 4 | × | ○ | × | ○ | × |
| – | 5 | × | × | × | × | × |
| All close | 6 | × | × | × | × | × |
| – | 7 | ○ | × | × | × | ○ |

Upper End          Lower End

Upper End    Lower End

Upper End　　　　　　　　　Lower End

Upper End    Lower End

Expansion Section

INJECTION TYPE HEAT EXCHANGE MODULE AND HEAT MANAGEMENT SYSTEM FOR VEHICLE APPLYING THE SAME

CROSS REFERENCE TO RELATED APPLICATIONS

The present application claims priority of Korean Patent Application No. 10-2021-0176839 filed on Dec. 10, 2021, the entire contents of which is incorporated herein for all purposes by this reference.

BACKGROUND

Field of the Disclosure

The present disclosure relates to an injection type heat exchange module and a heat management system for a vehicle applying the same, and more specifically, to a separate technology of a heat management system for a vehicle, which may reduce an amount of separate heater used in the early stage of heating using a heat exchange module for exchanging heat between circulated refrigerants and the energy consumed by a compressor while heating.

Description of the Related Art

Recently, an electric vehicles, etc. have been widely distributed as an eco-friendly vehicle due to an environmental issue of an internal combustion engine vehicle. However, the conventional internal combustion engine vehicle does not require a separate heating energy because the interior may be heated through the waste heat of the engine, but the electric vehicle has a problem in that the heating is performed through separate energy because the electric vehicle, etc. does not have an engine and a heating source, thereby reducing fuel efficiency. In addition, it is true that this gives inconvenience such as shortening the distance to empty (DTE) of the electric vehicle and requiring frequent charging.

Meanwhile, the heat management of electric components such as a high voltage battery and a motor as well as a vehicle interior have been newly additionally needed due to motorization of the vehicle. In other words, in the electric vehicle, air conditioning for each of the interior space, the battery, and the electric components is differently needed, and there is a need for a technology capable of saving the energy as much as possible by responding independently to and efficiently collaborating with them. Therefore, an integrated heat management concept of a vehicle is being presented to increase heat efficiency by integrating the entire heat management of the vehicle while performing the heat management independently for each configuration.

In order to perform this integrated heat management of the vehicle, it is necessary to integrate and modularize complex coolant lines and components, and there is a need for a concept of modularization that is simple to manufacture even while modularizing a plurality of components and is compact even in terms of package.

Meanwhile, recently, research to increase the efficiency of a heat pump in the electric vehicle is being actively conducted. One method of increasing the efficiency of the heat pump is a gas injection type heat pump.

The gas injection type heat pump is a method of increasing a flow rate of the refrigerant circulated while heating using a heat exchanger (H/X) and an accumulator, thereby increasing the heating efficiency of the vehicle.

However, the conventional method of using the heat exchanger and the accumulator has a problem in that the heat exchanger and the accumulator should be separately provided, and a plurality of expansion valves should be each controlled.

The matters explained as the background art are for the purpose of enhancing the understanding of the background of the present disclosure and should not be taken as acknowledging that they correspond to the related art already known to those skilled in the art.

SUMMARY

The present disclosure has been proposed to solve the above problems, and an object of the present disclosure is to provide a technology to which a gas injection and a liquid injection are applied to a refrigeration cycle using a heat exchange module in which a heat exchanger and a flash tank are integrated.

In order to achieve the object, an injection type heat exchange module according to the present disclosure includes an outer tank composed of an upper chamber and a lower chamber separated from each other, the upper chamber being connected so that refrigerant is introduced from an outer condenser or an inner condenser, and the lower chamber being connected so that the refrigerant is introduced from an evaporator and connected to discharge the refrigerant to a compressor, an inner tank disposed inside the upper chamber of the outer tank to be heat-exchangeable with the refrigerant and connected to discharge the refrigerant to the compressor, the evaporator, or the lower chamber of the outer tank, a first valve disposed on an upper end of the inner tank and expanding or flowing the refrigerant of the upper chamber of the outer tank into the inner tank, or blocking the flow of the refrigerant into the inner tank as it rotates, a second valve rotatably coupled to a lower end of the inner tank, expanding or flowing the refrigerant inside the inner tank to the evaporator or blocking the flow of the refrigerant into the evaporator, and simultaneously expanding the refrigerant into the lower chamber of the outer tank or blocking the flow of the refrigerant into the lower chamber of the outer tank as it rotates, and an actuator simultaneously connected to the first valve and the second valve to be operated to simultaneously rotate the first valve and the second valve.

The inner tank may be formed in a structure in which a surface area of a part or all of an outer surface thereof is enlarged.

The inner tank may have an upper portion connected to the compressor so that a gaseous refrigerant is discharged into the compressor, and a lower portion connected to the evaporator so that a liquid refrigerant is discharged into the evaporator or the lower chamber of the outer tank.

The lower chamber of the outer tank may have an upper portion connected to the compressor so that a gaseous refrigerant is discharged into the compressor.

The first valve may be formed with a rotation wing hole and a rotation flow hole, the upper end of the inner tank may be formed with a fixing hole, and wherein relative positions between the rotation wing hole and the rotation flow hole and the fixing hole may be changed as the first valve is relatively rotated with respect to the inner tank.

The second valve may be formed with a rotation wing hole and a rotation expansion hole, the lower end of the inner tank may be formed with an injection hole communicating with the lower chamber of the outer tank and a cooling hole communicating with the evaporator, and relative positions between the rotation wing hole and the rotation expansion hole and the injection hole and cooling hole may be changed as the second valve is relatively rotated with respect to the inner tank.

The rotation wing hole may have extend in a circumferential direction of the first valve or the second valve, and have a shape of an enlarged or reduced open area as it extends.

The second valve may simultaneously expand the refrigerant inside the inner tank to the lower chamber of the outer tank and the evaporator through an injection hole communicating with the lower chamber of the outer tank and a cooling hole communicating with the evaporator, expand the refrigerant into the lower chamber of the outer tank, flow the refrigerant into the evaporator, or simultaneously block the flow of the refrigerant into the lower chamber of the outer tank and the evaporator at a position where the first valve flows the refrigerant of the upper chamber of the outer chamber into the inner tank.

The second valve may expand the refrigerant inside the inner tank to the evaporator through a cooling hole communicating with the evaporator, or expand the refrigerant into the lower chamber of the outer tank through an injection hole communicating with the lower chamber of the outer tank at a position where the first valve expands the refrigerant of the upper chamber of the outer tank into the inner tank.

In order to achieve the object, a heat management system for a vehicle to which an injection type heat exchange module according to the present disclosure is applied includes a first refrigerant line through which refrigerant flows from the inner tank and the lower chamber of the outer tank into the inner condenser through the compressor, a second refrigerant line branched from the inner tank into the evaporator and the outer condenser to have the refrigerant flow therethrough, a third refrigerant line through which the refrigerant flows from a chiller or the evaporator into the lower chamber of the outer tank, and a fourth refrigerant line through which the refrigerant flows from the outer condenser and the inner condenser into the upper chamber of the outer tank.

The system may further include a control unit configured to control an operation of the compressor and control the rotation of an actuator so that the first valve and the second valve expand, flow, or block the refrigerant.

In a gas injection mode, the control unit may control the actuator so that the first valve expands the refrigerant of the upper chamber of the outer tank into the inner tank, and the second valve expands the refrigerant inside the inner tank into the evaporator through a cooling hole communicating with the evaporator.

In a liquid injection mode, the control unit may control the actuator so that the first valve flows the refrigerant of the upper chamber of the outer tank into the inner tank, and the second valve simultaneously expands the refrigerant inside the inner tank into the lower chamber of the outer tank and the evaporator through an injection hole communicating with the lower chamber of the outer tank and a cooling hole communicating with the evaporator.

The injection type heat exchange module according to the present disclosure is the module in which the heat exchanger and the flash tank are integrated into one, and in particular, includes the valve by which expansion or flow of the refrigerant is adjusted by one actuator, thereby having the simplified and efficient configuration of the system.

BRIEF DESCRIPTION OF THE FIGURES

The above and other objects, features and other advantages of the present disclosure will be larger clearly understood from the following detailed description when taken in conjunction with the accompanying drawings, in which:

FIG. 3 is a table showing open states of a first valve and a second valve according to various control modes of the injection type heat exchange module according to the exemplary embodiment of the present disclosure.

DETAILED DESCRIPTION

Figure 1:
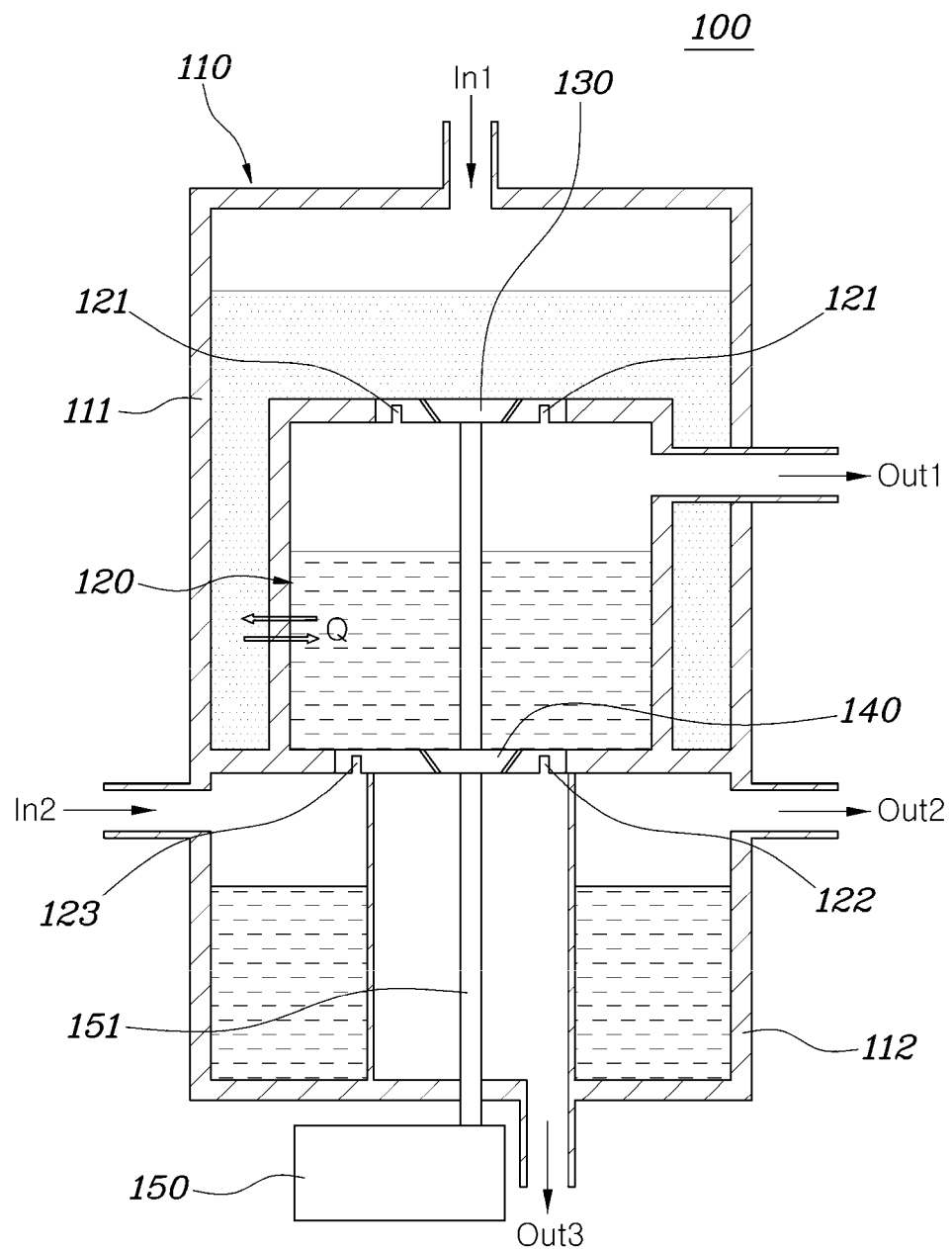
FIG. 1 is a configuration diagram of an injection type heat exchange module according to an exemplary embodiment of the present disclosure.

Specific structural or functional descriptions for exemplary embodiments of the present disclosure disclosed in the present specification or application are only exemplified for the purpose of describing the exemplary embodiments according to the present disclosure, and the exemplary embodiments according to the present disclosure may be carried out in various forms and should not be interpreted as being limited to the exemplary embodiments described in the present specification or application.

Since the exemplary embodiment according to the present disclosure may have various changes and have various forms, specific exemplary embodiments will be shown in the drawings and described in detail in the present specification or application. However, this is not intended to limit the exemplary embodiments according to the concept of the present disclosure to a specific disclosed form, and should be understood to include all changes, equivalents, or substitutes included in the spirit and technical scope of the present disclosure.

Terms such as first and/or second may be used to describe various components, but the components should not be limited to the terms. The terms are used only for the purpose of distinguishing one component from other components, and for example, a first component may be referred to as a second component, and similarly, the second component may also be referred to as the first component, without departing from the scope according to the concept of the present disclosure.

When a certain component is said to be "connected" or "coupled" to another component, it should be understood that the certain component may be directly connected or coupled to another component, but other components may also exist therebetween. On the other hand, when a certain component is said to be "directly connected to" or "directly coupled to" another component, it should be understood that other components do not exist therebetween. Other expressions for describing the relationship between components, that is, expressions such as "between" and "directly between" or "adjacent to" and "directly adjacent to" should also be interpreted in the same manner.

The terms used in the present specification are only used to describe the specific exemplary embodiments and are not intended to limit the present disclosure. The singular expression also includes the plural expression unless otherwise specified in the context. It should be understood that terms such as "comprises" or "has" used in the present specification specify the presence of the practiced feature, number, step, operation, component, part, or a combination thereof, and do not exclude the presence or addition possibility of one or more other features, numbers, steps, operations, components, parts, or a combination thereof in advance.

Unless defined otherwise, all terms used herein, including technical or scientific terms, have the same meaning as commonly understood by those skilled in the art to which the present disclosure pertains. Terms such as those defined in commonly used dictionaries should be interpreted as having meanings consistent with the meanings in the context of the related art, and are not interpreted as an ideal or excessively formal meaning unless explicitly defined in the present specification.

Hereinafter, the present disclosure will be described in detail by describing preferred exemplary embodiments of the present disclosure with reference to the accompanying drawings. The same reference numerals presented in each drawing indicate the same members.

Research on which an ejector or an injection is applied is being actively conducted for high performance of a refrigeration cycle.

A refrigeration cycle to which the conventional ejector is applied has a structure of flowing the refrigerant condensed by a condenser to a gas-liquid separator by a compression recovery function using the venturi effect of the ejector and circulating the liquid refrigerant through an expansion valve and an evaporator. Therefore, it is possible to reduce the consumed power (work) of the compressor and increase the flow rate of the refrigerant compared to a general refrigeration cycle.

However, the refrigeration cycle to which the conventional ejector is applied has a problem in that it is difficult to secure the flow rate of an additional refrigerant in a low-temperature state.

The refrigeration cycle to which the injection is applied is classified into a gas injection and a liquid injection.

The refrigeration cycle to which the gas injection is applied flows the refrigerant to an evaporator through a 2-stage expansion process and injects a gaseous refrigerant of an intermediate pressure primarily expanded into a compressor. Therefore, it is possible to increase the flow rate of the refrigerant flowing into an outer condenser, or an inner condenser and the compressor, and to improve the compression effect by the 2-stage compression to reduce the consumed power of the compressor. In particular, it is possible to solve a reduction in performance of the refrigeration cycle in cold and tropical areas.

On the other hand, the refrigeration cycle to which the liquid injection is applied may prevent overheating of the compressor and at the same time, additionally increase the flow rate of the refrigerant by absorbing the heat consumption of the compressor.

Specifically, the heat exchanger type separates a part of the refrigerant on a rear end of the outer condenser or the inner condenser and exchanges heat with the refrigerant of the intermediate pressure primarily expanded. Therefore, it is possible to reduce the dryness of the refrigerant flowing into the evaporator by secondarily expanding the refrigerant while vaporizing the separated refrigerant.

In addition, the gas-liquid separator type expands the entire refrigerant on the rear end of the outer condenser or the inner condenser, and then separates the gaseous refrigerant and the liquid refrigerant to flow the gaseous and liquid refrigerant into the compressor and a secondary expansion valve, respectively. Therefore, it is possible to reduce the dryness of the refrigerant flowing into the evaporator by separating the liquid refrigerant to secondarily expand the liquid refrigerant.

Figure 2:
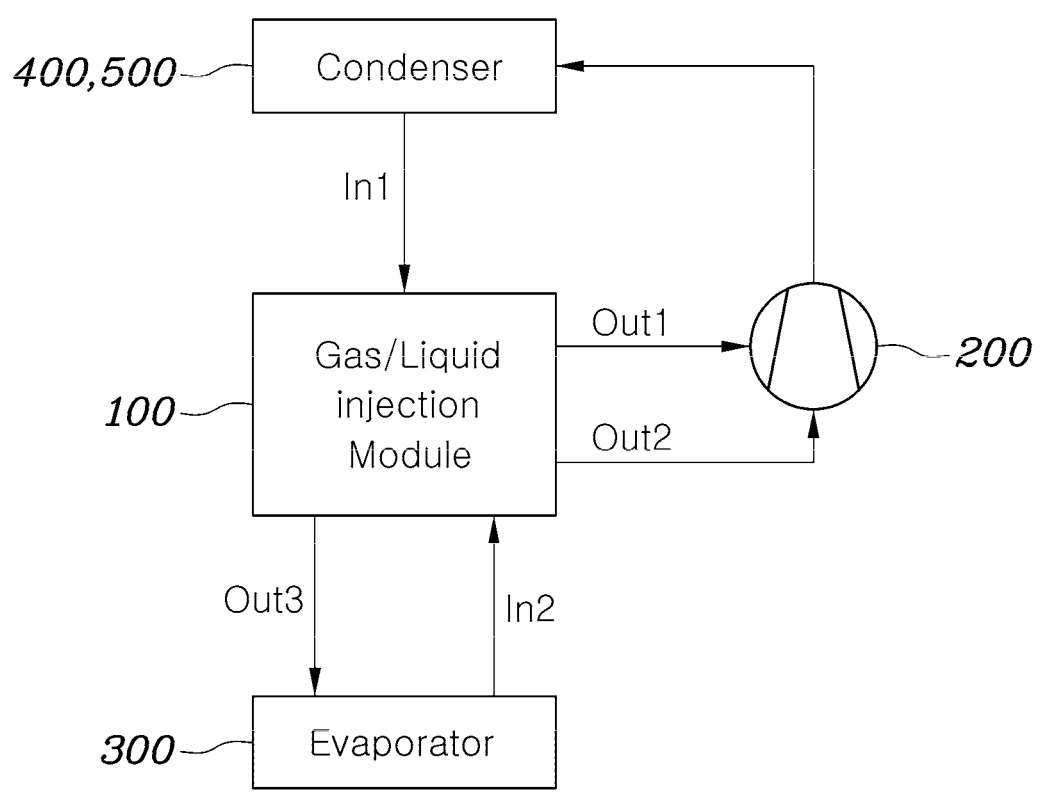
FIG. 2 is a circuit diagram of a heat management system to which the injection type heat exchange module according to the exemplary embodiment of the present disclosure is applied.

FIG. 1 is a configuration diagram of an injection type heat exchange module 100 according to an exemplary embodiment of the present disclosure, and FIG. 2 is a circuit diagram of a heat management system to which the injection type heat exchange module 100 according to the exemplary embodiment of the present disclosure is applied.

Referring to FIGS. 1 and 2, the injection type heat exchange module 100 according to an embodiment of the present disclosure includes an outer tank 110 composed of an upper chamber 111 and a lower chamber 112 separated from each other, the upper chamber 111 being connected so that refrigerant is introduced from an outer condenser 500 or an inner condenser 400, and the lower chamber 112 being connected so that the refrigerant is introduced from an evaporator 300 and connected to discharge the refrigerant into a compressor 200. The heat exchange module 100 further includes an inner tank 120 disposed inside the upper chamber 111 of the outer tank 110 to be heat-exchangeable with the refrigerant and connected to discharge the refrigerant into the compressor 200, the evaporator 300, or the lower chamber 112 of the outer tank 110. Additionally, a first valve 130 is positioned on an upper end of the inner tank 120 and expanding or flowing the refrigerant of the upper chamber 111 of the outer tank 110 into the inner tank 120, or blocking the flow of the refrigerant into the inner tank 120 as it rotates, and a second valve 140 is rotatably coupled to a lower end of the inner tank 120, expanding or flowing the refrigerant inside the inner tank 120 into the evaporator 300, or blocking the flow of the refrigerant and a the same time, expanding the refrigerant into the lower chamber 112 of the outer tank 110 or blocking the flow of the refrigerant into the lower chamber 112 of the outer tank 110 as it rotates. The exchange module 100 also includes an actuator 150 simultaneously connected to the first valve 130 and the second valve 140 and operated to simultaneously rotate the first valve 130 and the second valve 140.

Specifically, the injection type heat exchange module 100 according to an embodiment of the present disclosure may be a module in which a flash tank, which expands the primarily expanded refrigerant again and separates the gaseous refrigerant and the liquid refrigerant, or an accumulator and a heat exchanger (H/X), and an expansion valve (EXV) are integrated. In particular, operations of three expansion valves may be adjusted by one actuator 150.

As described later, the injection type heat exchange module 100 may be controlled in a gas injection mode to increase the flow rate of the refrigerant circulated while heating to increase heating efficiency of the vehicle, thereby increasing efficiency of a heat pump. In addition, the injection type heat exchange module 100 may be controlled in a liquid injection mode to increase the flow rate of the refrigerant during cooling in hot season, thereby increasing cooling efficiency of the vehicle. In addition, it is possible to increase the heating and cooling efficiency of the vehicle through the heat exchange between the refrigerants inside the injection type heat exchange module 100.

The outer tank 110 may be separated into the upper chamber 111 and the lower chamber 112. In particular, the upper chamber 111 of the outer tank 110 may have the refrigerant introduced from the outer condenser 500 or the inner condenser 400 and discharge the refrigerant into the inner tank 120 through the first valve 130. As shown, the first valve 130 may be provided on a partition wall between the upper chamber 111 and the lower chamber 112 of the outer tank 110.

The inner tank 120 may be positioned inside the outer tank 110 and particularly positioned inside the upper chamber 111 of the outer tank 110. The inner tank 120 may be heat-exchangeable with the refrigerant inside the upper chamber 111 of the outer tank 110. The inner tank 120 may be made of a material with high heat conductivity, for example, a copper, an aluminum, or an alloy thereof. In particular, the heat of the refrigerant discharged from the upper chamber 111 of the outer tank 110 may be exchanged to be absorbed into the refrigerant discharged into the inner tank 120 through the first valve 130.

The inner tank 120 may have the refrigerant introduced from the upper chamber 111 of the outer tank 110 through the first valve 130 and discharge the refrigerant to the compressor 200 or discharge the refrigerant to the evaporator 300 or the lower chamber 112 of the outer tank 110 through the second valve 140.

The compressor 200 is a means for compressing the sucked refrigerant to convert the refrigerant into a high-pressure refrigerant. The compressor 200 has an injection port into which the gaseous refrigerant of the intermediate pressure is injected formed in a compression intermediate area separately from an inlet port into which the refrigerant flows and the gas injection type compressor 200 for 2-stage compression in which the refrigerant is mixed is applied thereto.

The inner condenser 400 is a means installed on an inner air-conditioning device for a vehicle to heat the vehicle interior by exchanging heat between the compressed refrigerant passing through the inner condenser 400 and the air supplied to a vehicle interior and dissipating the heat of the refrigerant with the air supplied to the vehicle interior.

The first valve 130 and the second valve 140 open or close the flow of the refrigerant and adjust an opening degree to flow (bypass) the refrigerant as it is, or to expand the refrigerant.

The evaporator 300 is a means for exchanging heat between the refrigerant and the air recirculated into the interior space of the vehicle, and serves to absorb the heat of the air recirculated into the interior space of the vehicle to heat the refrigerant.

The first valve 130 may be disposed on the upper end of the inner tank 120 and particularly positioned between the upper chamber 111 of the outer tank 110 and the inner tank 120. In addition, the first valve 130 may be rotated around the upper end of the inner tank 120 to expand or flow the refrigerant of the upper chamber 111 of the outer tank 110 into the inner tank 120 or block the flow of the refrigerant into the inner tank 120.

The second valve 140 may be disposed on the lower end of the inner tank 120 and positioned between the inner tank 120 and the lower chamber 112 of the outer tank 110 to be rotated around the lower end of the inner tank 120 to expand or flow the refrigerant inside the inner tank 120 into the evaporator 300, or block the flow of the refrigerant into the evaporator 300 and at the same time, positioned between the inner tank 120 and the evaporator 300 to be rotated around the lower end of the inner tank 120 to expand the refrigerant into the lower chamber 112 of the outer tank 110 or block the flow of the refrigerant into the lower chamber 112 of the outer tank 110.

The actuator 150 may be connected to both the first valve 130 and the second valve 140, and operated to simultaneously rotate the first valve 130 and the second valve 140 by rotating a shaft 151 connecting the first valve 130 and the second valve 140 disposed to be spaced apart from each other. An operation of the actuator 150 may be controlled by a control unit 600 to be described later.

In other words, the injection type heat exchange module 100 according to the exemplary embodiment of the present disclosure is a module in which the heat exchanger and the flash tank are integrated, and particularly includes the valve by which the expansion or flow of the refrigerant is adjusted by one actuator 150, thereby having the simplified and efficient configuration of the system.

Additionally, the inner tank 120 may be formed in a structure in which a surface area of a part or all of an outer surface thereof is enlarged.

In an embodiment, the outer surface of the inner tank 120 may be formed with a plurality of dimples or flowing grooves to enlarge a surface area, thereby activating the heat exchange with the refrigerants inside the outer tank 110.

In particular, the inner tank 120 may have a structure in which surface areas of the lower surface of the inner tank 120 and a lower portion of an outer circumferential surface thereof, which are in contact with the liquid refrigerant among the outer surface of the inner tank 120, are enlarged so that the heat exchange with the liquid refrigerant stored in the upper chamber 111 of the outer tank 110 is activated.

The inner tank 120 may have an upper portion connected to the compressor 200 so that the gaseous refrigerant is discharged to the compressor 200 and a lower portion connected to the evaporator 300 so that the liquid refrigerant is discharged into the evaporator 300 or the lower chamber 112 of the outer tank 110.

In other words, the gaseous refrigerant and the liquid refrigerant may coexist inside the inner tank 120, the gaseous refrigerant with relatively small specific gravity may be discharged from the upper portion of the inner tank 120 into the compressor 200, and the liquid refrigerant with relatively great specific gravity may be discharged from the lower portion of the inner tank 120 into the evaporator 300 or the lower chamber 112 of the outer tank 110.

In addition, the lower chamber 112 of the outer tank 110 may have an upper portion connected to the compressor 200 so that the gaseous refrigerant is discharged into the compressor 200.

The gaseous refrigerant and the liquid refrigerant may coexist even in the lower chamber 112 of the outer tank 110, and the gaseous refrigerant with relatively small specific gravity may be discharged from the upper portion of the lower chamber 112 of the outer tank 110 into the compressor 200.

FIG. 3 is a table showing open states of the first valve 130 and the second valve 140 according to various control modes of the injection type heat exchange module 100 according to the exemplary embodiment of the present disclosure, and FIGS. 4 to 10 show the opening states of the first valve 130 and the second valve 140 according to various control modes of the present disclosure.

Referring to FIGS. 3 to 10, the upper end of the inner tank 120 may be formed with a plurality of fixing holes 121, and a rotation wing hole 131 or a rotation flow hole 132 of the first valve 130 may adjust the flow, expansion, or blocking of the fluid depending on the relative positions with the plurality of fixing holes 121. In particular, the flow or expansion of the fluid may be adjusted depending on the relative position of the rotation wing hole 131 and the fixing hole 121.

In addition, the second valve 140 may be formed with a rotation wing hole 141 and a rotation expansion hole 142, the lower end of the inner tank 120 may be formed with an injection hole 123 communicating with the lower chamber 112 of the outer tank 110 and a cooling hole 122 communicating with the evaporator 300, and the relative positions between the rotation wing hole 141 and the rotation expansion hole 142 and the injection hole 123 and the cooling hole 122 may be changed as the second valve 140 is relatively rotated with respect to the inner tank 120.

In particular, the injection hole 123 may connect the inside of the inner tank 120 with the lower chamber 112 of the outer tank 110, and the cooling hole 122 may connect the inside of the inner tank 120 with the evaporator 300. The rotation wing hole 141 may adjust the flow or expansion of the fluid depending on the relative position with the injection hole 123 or the cooling hole 122, and the rotation expansion hole 142 may adjust the expansion of the fluid depending on the relative position with the injection hole 123 or the cooling hole 122.

In other words, the rotation wing hole 131 and the rotation flow hole 132 of the first valve 130 or the rotation wing hole 141 and the rotation expansion hole 142 of the second valve 140 may each allow the flow or expansion of the fluid as they have the relative positions matched with the fixing hole 121 formed in the upper end of the inner tank 120, or the injection hole 123 or the cooling hole 122 formed in the lower end of the inner tank 120, and conversely, they may block the flow or expansion of the fluid as the relative positions therebetween deviate.

The first valve 130 may be formed with a rotation wing hole 131 and a rotation flow hole 132, the upper end of the inner tank 120 may be formed with the fixing hole 121, and the relative positions between the rotation wing hole 131 and the rotation flow hole 132 and the fixing hole 121 may be changed as the first valve 130 is relatively rotated with respect to the inner tank 120.

The upper end of the inner tank 120 may be formed with a plurality of fixing holes 121 at positions spaced apart from each other in a circumferential direction, and the first valve 130 may be formed with the rotation wing hole 131 and the rotation flow hole 132 spaced apart from each other in the circumferential direction. As the exemplary embodiment, the plurality of fixing holes 121 may be disposed to be spaced apart from each other by 180 degrees in the circumferential direction, and the rotation wing hole 131 and the rotation flow hole 132 of the first valve 13 may be spaced apart from each other by 90 degrees.

The lower end of the inner tank 120 may be formed with the injection hole 123 and the cooling hole 122 spaced apart from each other in the circumferential direction, and the second valve 140 may be formed with the rotation wing hole 141 and the rotation expansion hole 142 spaced apart from each other in the circumferential direction. In one embodiment, the injection hole 123 and the cooling hole 122 may be spaced apart from each other by 90 degrees in the circumferential direction, and the rotation wing hole 141 and the rotation expansion hole 142 of the second valve 140 may be greatly spaced apart from each other by an extended radius of the rotation wing hole 141, in addition to 90 degrees and the second valve 140 may be disposed to block the rotation wing hole 141 at a rotation position where the rotation expansion hole 142 and the cooling hole 122 are matched.

The rotation wing hole 131 and the rotation flow hole 132 of the first valve 130 may be rotated around the upper end of the inner tank 120 to allow or block the flow or expansion of the fluid depending on the relative positions with the plurality of fixing holes 121, and the rotation wing hole 141 and the rotation expansion hole 142 of the second valve 140 may be rotated around the lower end of the inner tank 120 to allow or block the flow or expansion of the fluid depending on the relative positions with the injection hole 123 and the cooling hole 122.

Figure 4:
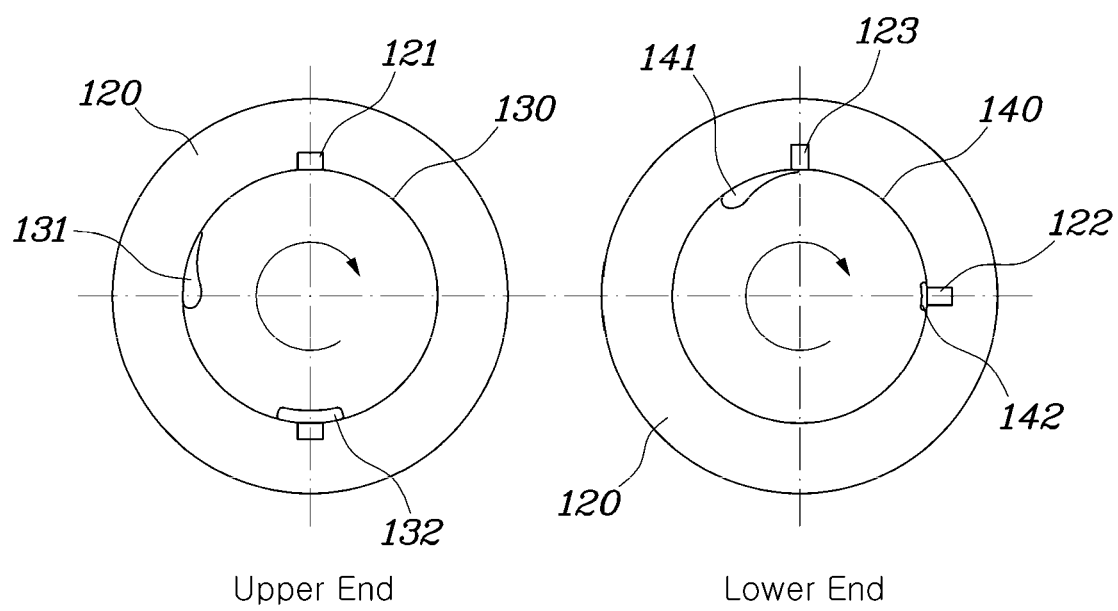
FIGS. 4, 5, 6, 7, 8, 9, and 10 show the open states of the first valve and the second valve according to various control modes according to the present disclosure.

As shown in the Case 1 of FIG. 4, in the liquid injection mode, the first valve 130 may be rotated so that the rotation wing hole 131 is blocked and the rotation flow hole 132 matches with the fixing hole of the upper end of the inner tank 120, and the second valve 140 may be rotated so that the expansion section of the rotation wing hole 141 matches with the injection hole 123 of the lower end of the inner tank 120 and at the same time, the rotation expansion hole 142 matches with the cooling hole 122. Therefore, in the liquid injection mode, the refrigerant may be bypassed in the fixing hole 121 of the upper end of the inner tank 120, and the refrigerant may be expanded in the injection hole 123 and the cooling hole 122 of the lower end of the inner tank 120.

Figure 5:
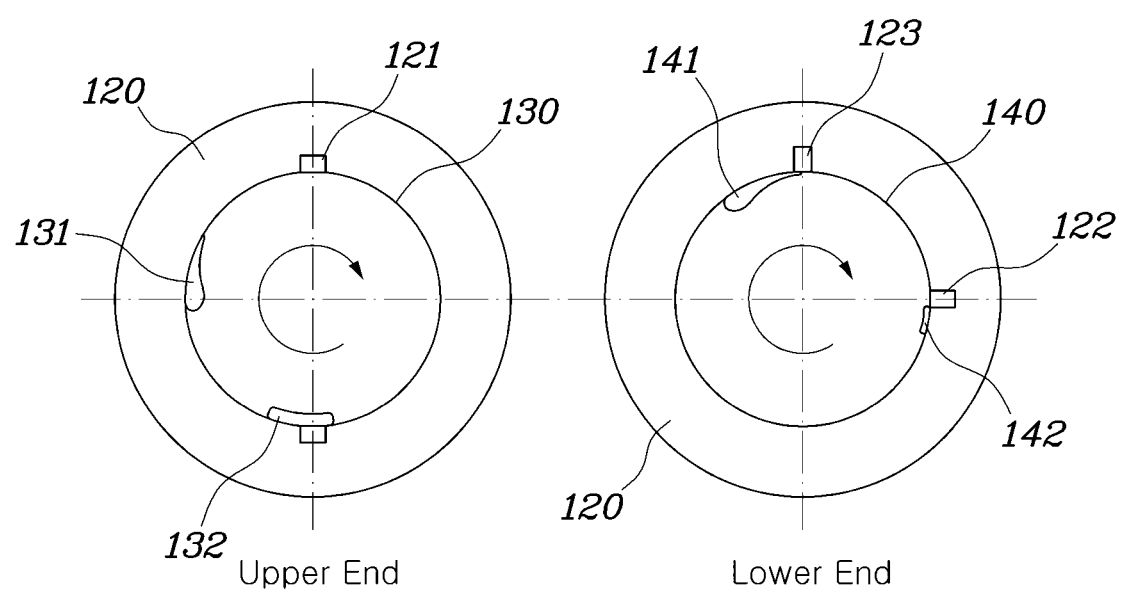

As shown in the Case 2 of FIG. 5, in an A/C expansion mode, the first valve 130 may be rotated so that the rotation wing hole 131 is blocked and the rotation flow hole 132 matches with the fixing hole 121 of the upper end of the inner tank 120, and the second valve 140 may be rotated so that the expansion section of the rotation wing hole 141 matches with the injection hole 123 of the lower end of the inner tank 120 and at the same time, the rotation expansion hole 142 is blocked. Therefore, in the A/C expansion mode, the refrigerant may be bypassed in the fixing hole 121 of the upper end of the inner tank 120, the refrigerant may be expanded in the injection hole 123 of the lower end of the inner tank 120, and at the same time, the flow of the refrigerant may be blocked in the cooling hole 122.

Figure 6:
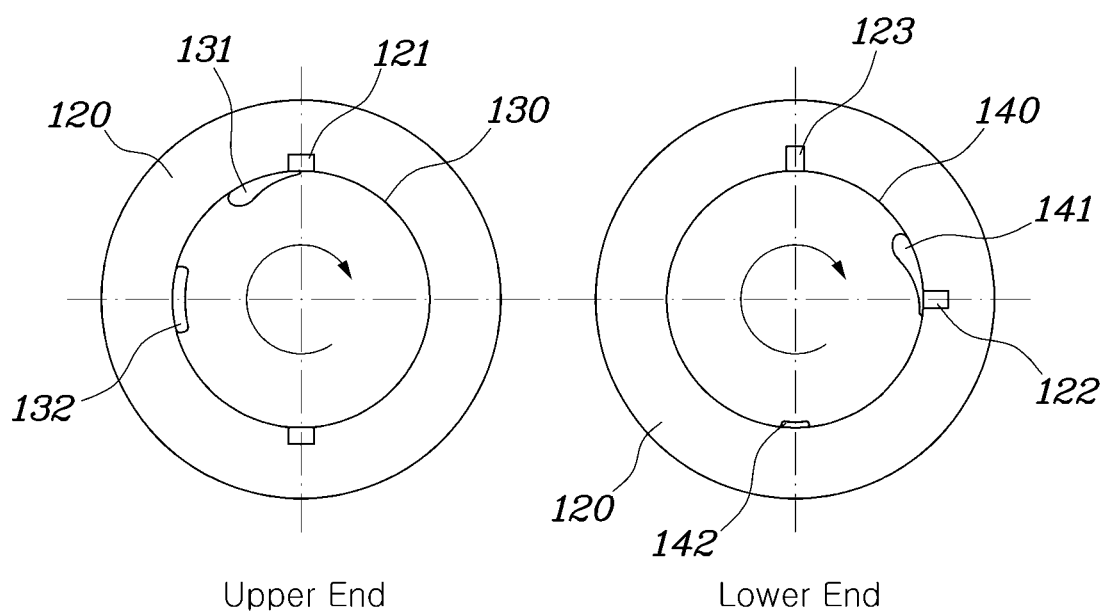

As shown in the Case 3 of FIG. 6, in the gas injection mode, the first valve 130 may be rotated so that the expansion section of the rotation wing hole 131 matches with the fixing hole 121 of the upper end of the inner tank 120 and the rotation flow hole 132 is blocked, and the second valve 140 may be rotated so that the expansion section of the rotation wing hole 141 matches with the cooling hole 122 of the lower end of the inner tank 120 and at the same time, the rotation expansion hole 142 is blocked. Therefore, in the gas injection mode, the refrigerant may be expanded in the fixing hole 121 of the upper end of the inner tank 120, the refrigerant may be expanded in the cooling hole 122 of the lower end of the inner tank 120, and at the same time, the injection hole 123 of the lower end of the inner tank 120 may be blocked.

Figure 7:
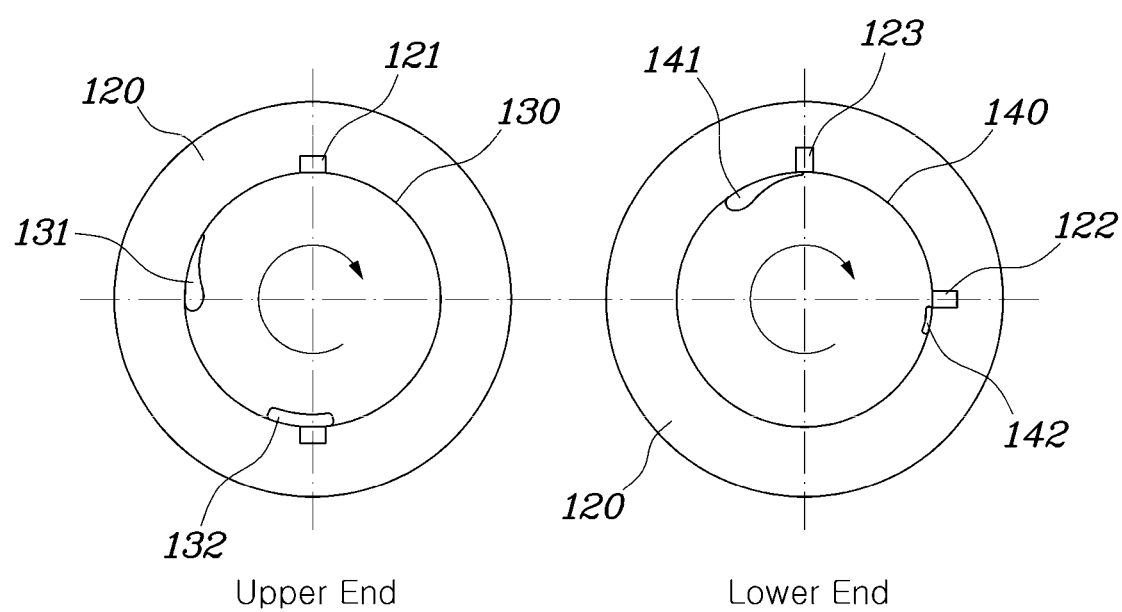

As shown in the Case 4 of FIG. 7, the first valve 130 may be rotated so that the bypass section of the rotation wing hole 131 matches with the fixing hole 121 of the upper end of the inner tank 120 and the rotation flow hole 132 is blocked, and the second valve 140 may be rotated so that the bypass section of the rotation wing hole 141 matches with the cooling hole 122 and the rotation expansion hole 142 is blocked. Therefore, the refrigerant may be bypassed in the fixing hole 121 of the upper end of the inner tank 120, and the refrigerant may be bypassed in the cooling hole 122 of the lower end of the inner tank 120.

Figure 8:
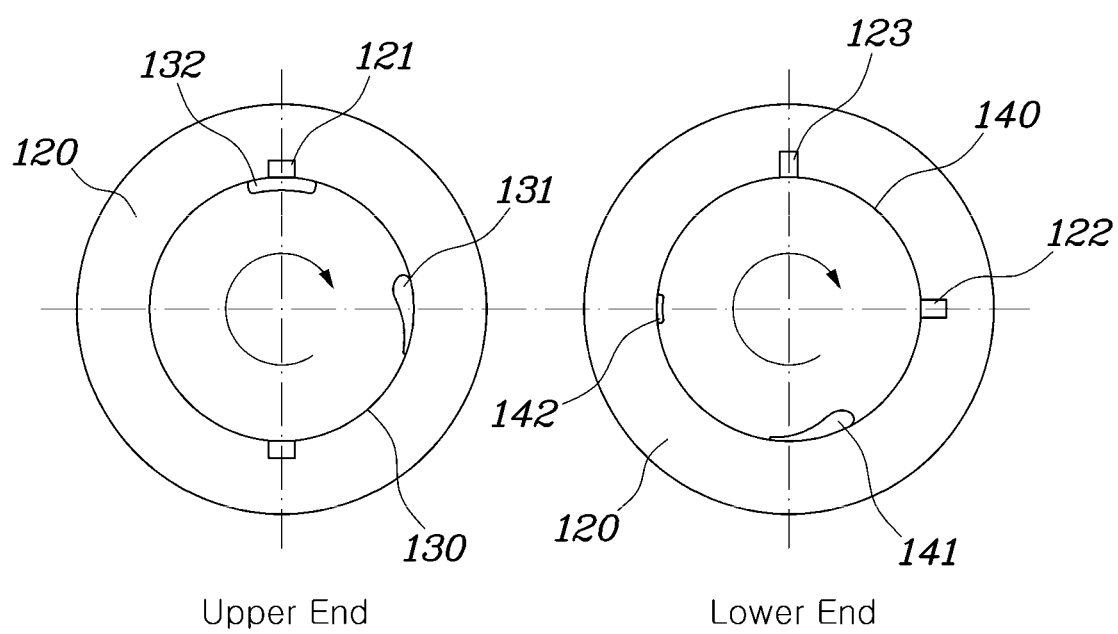

As shown in the Case 5 of FIG. 8, the first valve 130 may be rotated so that the rotation wing hole 131 is blocked and the rotation flow hole 132 matches with the fixing hole 121 of the upper end of the inner tank 120, and the second valve 140 may be rotated so that the rotation wing hole 141 and the rotation expansion hole 142 are blocked. Therefore, the refrigerant may be bypassed in the fixing hole 121 of the upper end of the inner tank 120, and the flow of the refrigerant may be blocked in the cooling hole 122 and the injection hole 123 of the lower end of the inner tank 120.

Figure 9:
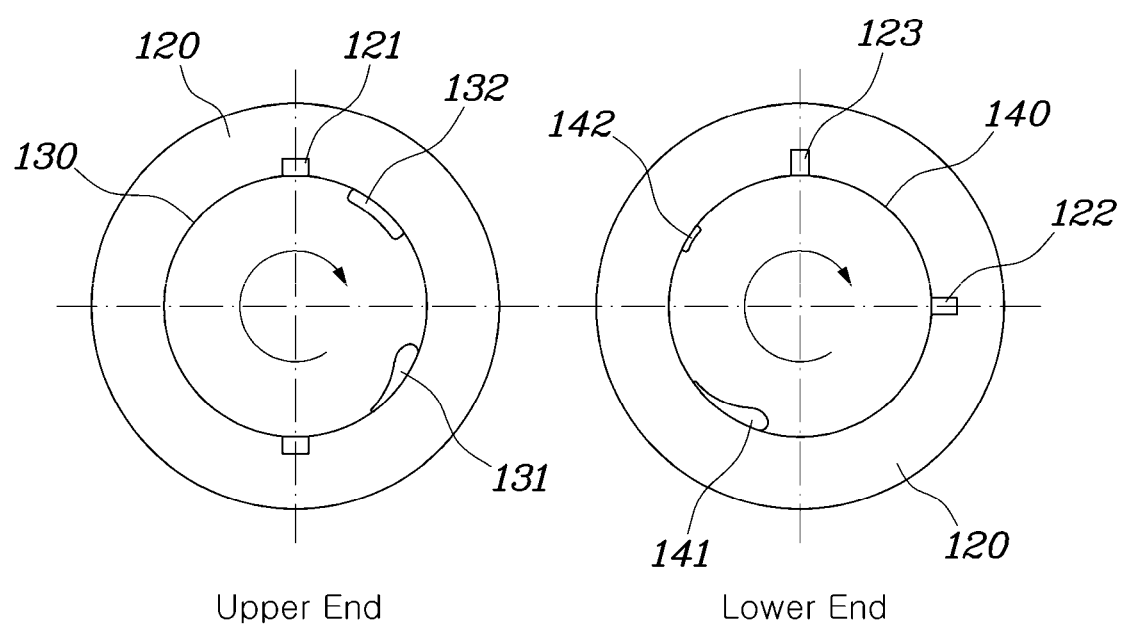

As shown in the Case 6 of FIG. 9, the first valve 130 may be rotated so that the rotation wing hole 131 and the rotation flow hole 132 are blocked and the second valve 140 may be rotated so that the rotation wing hole 141 and the rotation expansion hole 142 are blocked. Therefore, the flow of the refrigerant may be blocked in the fixing hole 121 of the upper end of the inner tank 120, and the flow of the refrigerant may be blocked in the cooling hole 122 and the injection hole 123 of the lower end of the inner tank 120.

Figure 10:
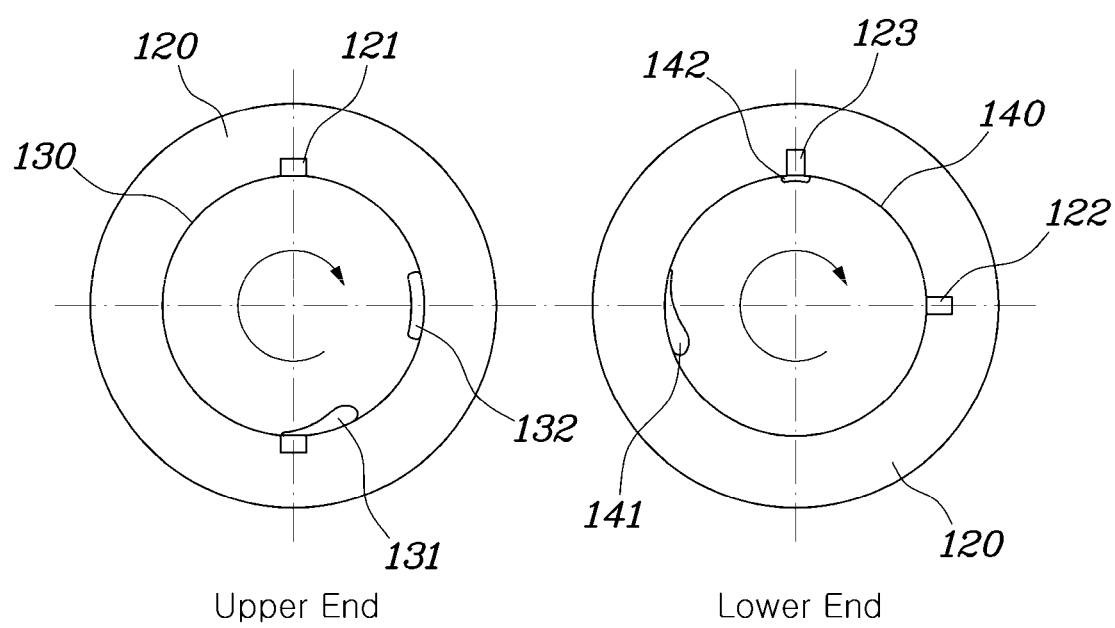

As shown in the Case 7 of FIG. 10, the first valve 130 may be rotated so that the expansion section of the rotation wing hole 131 matches with the fixing hole 121 of the upper end of the inner tank 120 and the rotation flow hole 132 is blocked, and the second valve 140 may be rotated so that the rotation wing hole 141 is blocked and the rotation expansion hole 142 matches with the injection hole 123. Therefore, the refrigerant may be expanded in the fixing hole 121 of the upper end of the inner tank 120, the refrigerant may be expanded in the injection hole 123 of the lower end of the inner tank 120, and at the same time, the flow of the refrigerant may be blocked in the cooling hole 122.

In summary, the second valve 140 may simultaneously expand the refrigerant inside the inner tank 120 to the lower chamber 112 of the outer tank 110 and the evaporator 300 through the injection hole 123 communicating with the lower chamber 112 of the outer tank 110 and the cooling hole 122 communicating with the evaporator 300, expand the refrigerant to the lower chamber 112 of the outer tank 110, flow the refrigerant to the evaporator 300, or simultaneously block the flow of the refrigerant into the lower chamber 112 of the outer tank 110 and the evaporator 300 at the position where the first valve 130 flows the refrigerant of the upper chamber 111 of the outer tank 110 into the inner tank 120.

In other words, in the Cases 1, 2, 4, and 5 where the first valve 130 flows the refrigerant of the upper chamber 111 of the outer tank 110 into the inner tank 120, the second valve 140 may simultaneously expand the refrigerant through the injection hole 123 and the cooling hole 122 (Case 1), expand the refrigerant to the lower chamber 112 of the outer tank 110 (Case 2), flow the refrigerant to the evaporator 300 (Case 4), or simultaneously block the flow of the refrigerant into the lower chamber 112 of the outer tank 110 and the evaporator 300 (Case 5).

In addition, the second valve 140 may expand the refrigerant inside the inner tank 120 to the evaporator 300 through the cooling hole 122 communicating with the evaporator 300 or expand the refrigerant to the lower chamber 112 of the outer tank 110 through the injection hole 123 communicating with the lower chamber 112 of the outer tank 110 at the position where the first valve 130 expands the refrigerant of the upper chamber 111 of the outer tank 110 into the inner tank 120.

In other words, in the Cases 3 and 7 where the first valve 130 may expand the refrigerant of the upper chamber 111 into the inner tank 120, the second valve 140 may expand the refrigerant inside the inner tank 120 to the evaporator 300 through the cooling hole 122 (Case 3) or expand the refrigerant to the lower chamber 112 of the outer tank 110 through the injection hole 123 (Case 7).

Figure 11:
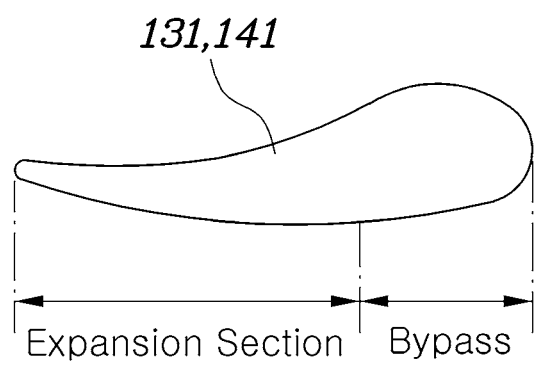
FIGS. 11, 12, and 13 each show a rotation wing hole, a rotation flow hole, and a rotation expansion hole according to the exemplary embodiment of the present disclosure.
Figure 12:
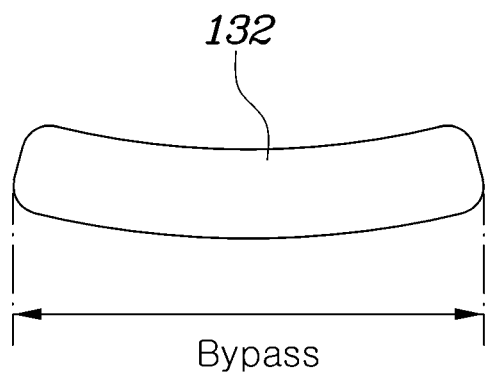
Figure 13:
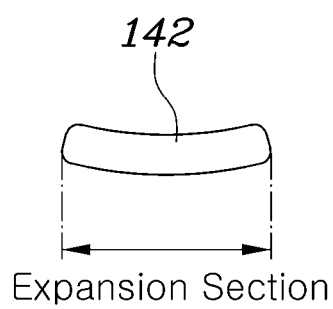

FIGS. 11 to 13 each show the rotation wing holes 131, 141, the rotation flow hole 132, and the rotation expansion hole 142 according to the exemplary embodiment of the present disclosure.

As shown in FIG. 11, the rotation wing holes 131, 141 of the first valve 130 and the second valve 140 may extend in the circumferential direction of the first valve 130 or the second valve 140, and have a shape of the enlarged or reduced open area as they extend. In particular, the rotation wing holes 131, 141 may be classified into the expansion section in which the open area is relatively reduced and the bypass section in which the open area is relatively enlarged in the extended direction.

In addition, as shown in FIG. 12, the rotation flow hole 132 may extend in the circumferential direction of the first valve 130 and have a shape in which the extended open area is constant. In particular, the entire extended area of the rotation flow hole 132 may be the bypass section.

In addition, as shown in FIG. 13, the rotation expansion hole 142 may extend in the circumferential direction of the second valve 140 and have a shape in which the extended open area is constant. In particular, the rotation expansion hole 142 has a relatively shorter extended length than that of the rotation flow hole 132, and the entire extended area thereof may be the expansion section.

Figure 14:
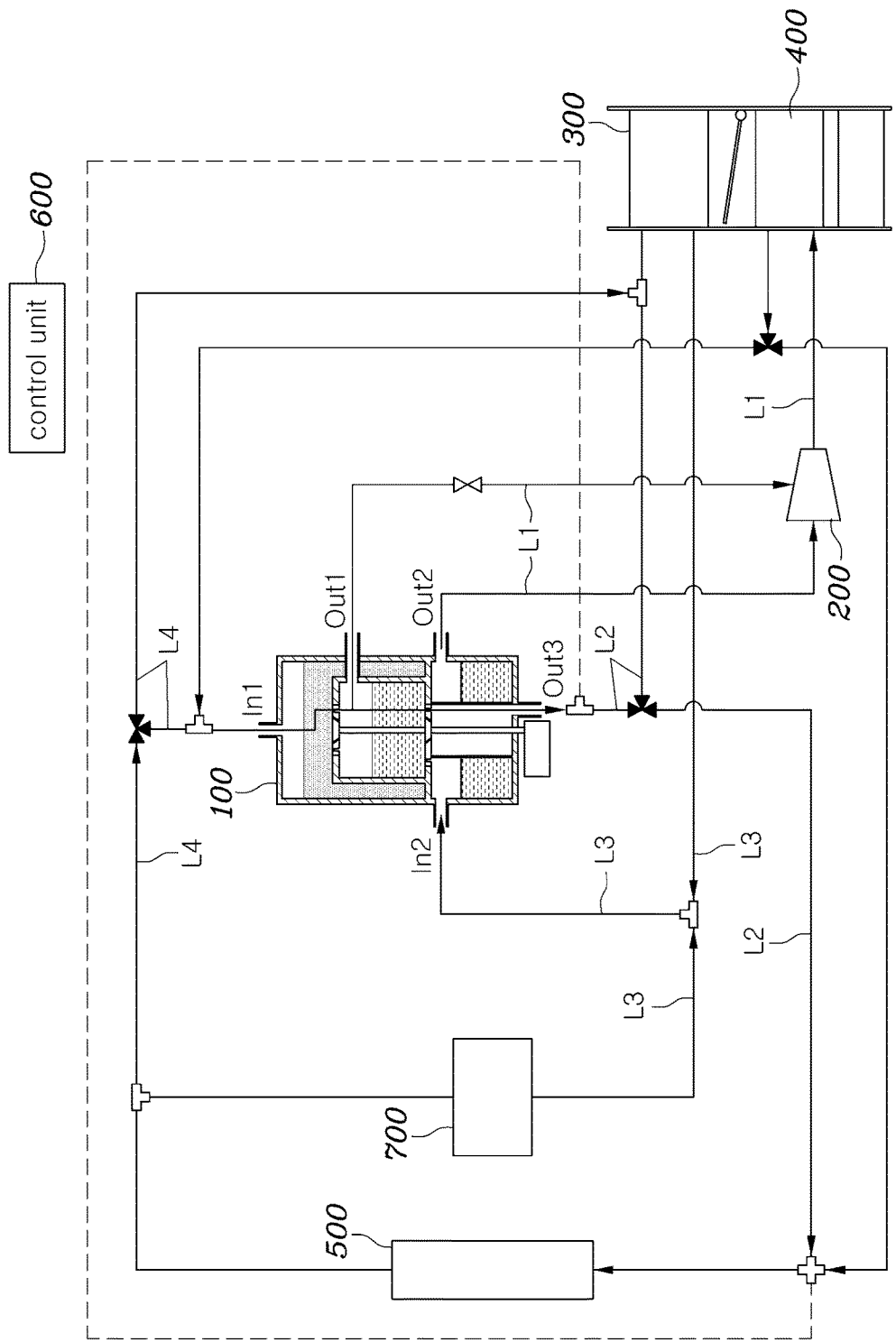
FIG. 14 is a circuit diagram of the heat management system for the vehicle to which the injection type heat exchange module according to the exemplary embodiment of the present disclosure is applied.

FIG. 14 is a circuit diagram of a heat management system for a vehicle to which the injection type heat exchange module 100 according to the exemplary embodiment of the present disclosure is applied.

Further referring to FIG. 14, the heat management system for the vehicle to which the injection type heat exchange module 100 according to an embodiment of the present disclosure is applied includes a first refrigerant line L1 through which the refrigerant flows from the inner tank 120 and the lower chamber 112 of the outer tank 110 to the inner condenser 400 through the compressor 200, a second refrigerant line L2 branched from the inner tank 120 into the evaporator 300 and the outer condenser 500 to have the refrigerant flow therethrough, a third refrigerant line L3 through which the refrigerant flows from a chiller or the evaporator 300 into the lower chamber 112 of the outer tank 110, and a fourth refrigerant line L4 through which the refrigerant flows from the outer condenser 500 and the inner condenser 400 to the upper chamber 111 of the outer tank 110.

The refrigerant discharged from the inner tank 120 and the outer tank 110 of the injection type heat exchange module 100 may flow to the compressor 200 through the first refrigerant line L1, and the refrigerant compressed by passing through the compressor 200 may flow to the inner condenser 400 through the first refrigerant line L1.

The second refrigerant line L2 may be branched so that the refrigerant discharged from the inner tank 120 of the injection type heat exchange module 100 flows into the evaporator 300 or flows into the outer condenser 500 through the second refrigerant line L2. A 3-way valve may be disposed at the branching point of the second refrigerant line L2, so that the flow direction may be controlled by the control unit 600 to be described later.

The refrigerant may flow into the lower chamber 112 of the outer tank 110 of the injection type heat exchange module 100 from the chiller or the evaporator 300 through the third refrigerant line L3. Here, the chiller may be a device in which a flowing refrigerant exchanges heat with a coolant that cools an electric component (not shown) or a battery (not shown).

The refrigerant may flow into the upper chamber 111 of the outer tank 110 of the injection type heat exchange module 100 from the outer condenser 500 and the inner condenser 400 through the fourth refrigerant line L4. The refrigerant discharged from the inner condenser 400 may flow directly into the upper chamber 111 of the outer tank 110 or flow into the upper chamber 111 of the outer tank 110 through the outer condenser 500. The refrigerant having passed through the outer capacitor 500 may flow into the upper chamber 111 of the outer tank 110 or flow into the evaporator 300 through the fourth refrigerant line L4.

The injection type heat exchange module 100 according to an embodiment of the present disclosure may further include the control unit 600 configured to control the operation of the compressor 200 and control the rotation of the actuator 150 so that the first valve 130 and the second valve 140 expand, flow, or block the refrigerant.

The control unit 600 according to an embodiment of the present disclosure may be implemented through a non-volatile memory (not shown) configured to store data relating to an algorithm configured to control operations of various components of a vehicle or a software command reproducing the algorithm and a processor (not shown) configured to perform an operation described below using the data stored in the corresponding memory. Here, the memory and the processor may be implemented as separate chips. Alternatively, the memory and the processor may be implemented as a single chip integrated with each other. The processor may take the form of one or more processors.

The control unit 600 may control the actuator 150 so that the first valve 130 and the second valve 140 are simultaneously rotated and additionally control the 3-Way valve provided on the refrigerant line of the heat management system for the vehicle to control the flow direction of the refrigerant through the refrigerant line.

Figure 15:
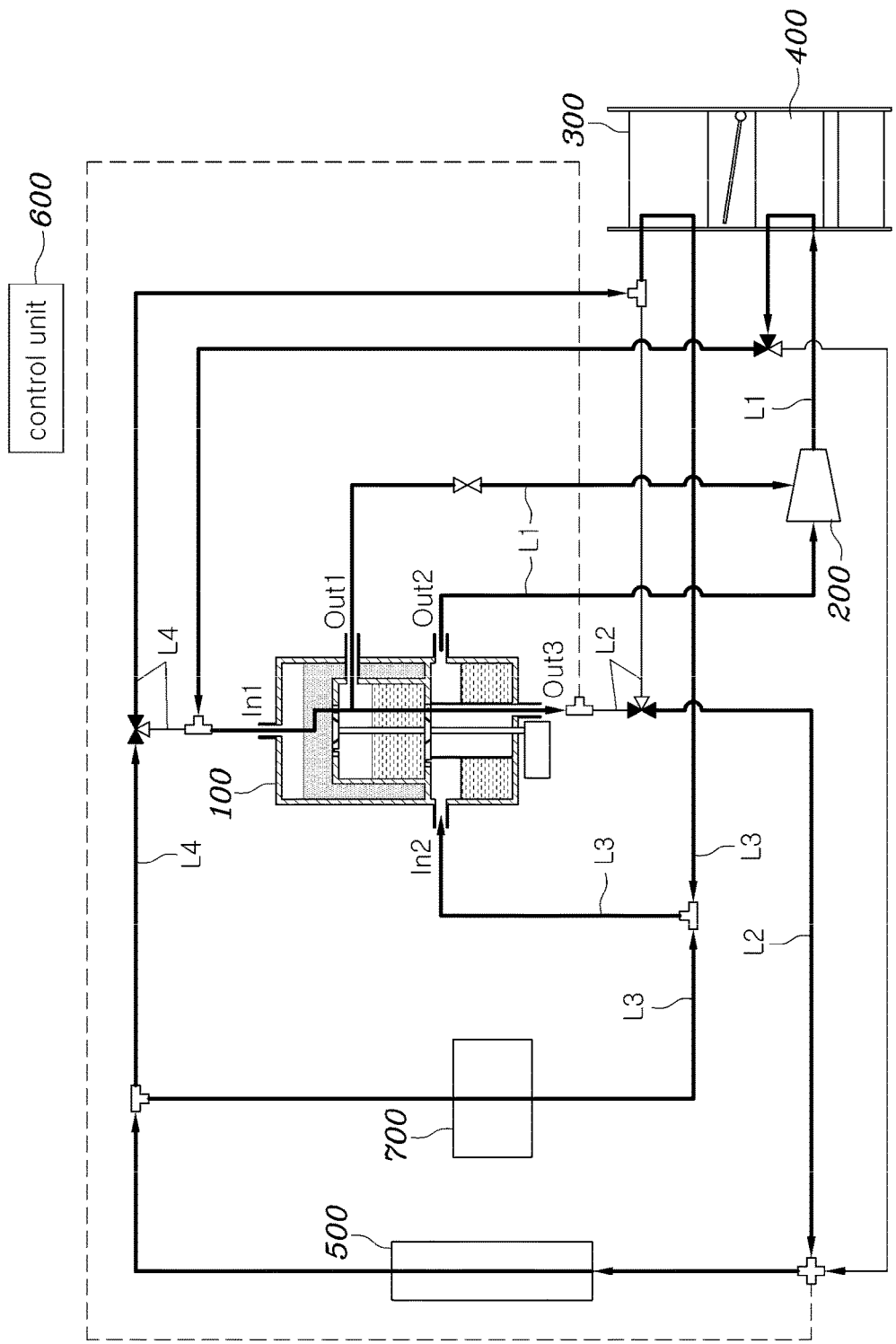
FIGS. 15 and 16 show an operation mode of the heat management system for the vehicle to which the injection type heat exchange module according to the exemplary embodiment of the present disclosure is applied.
Figure 16:
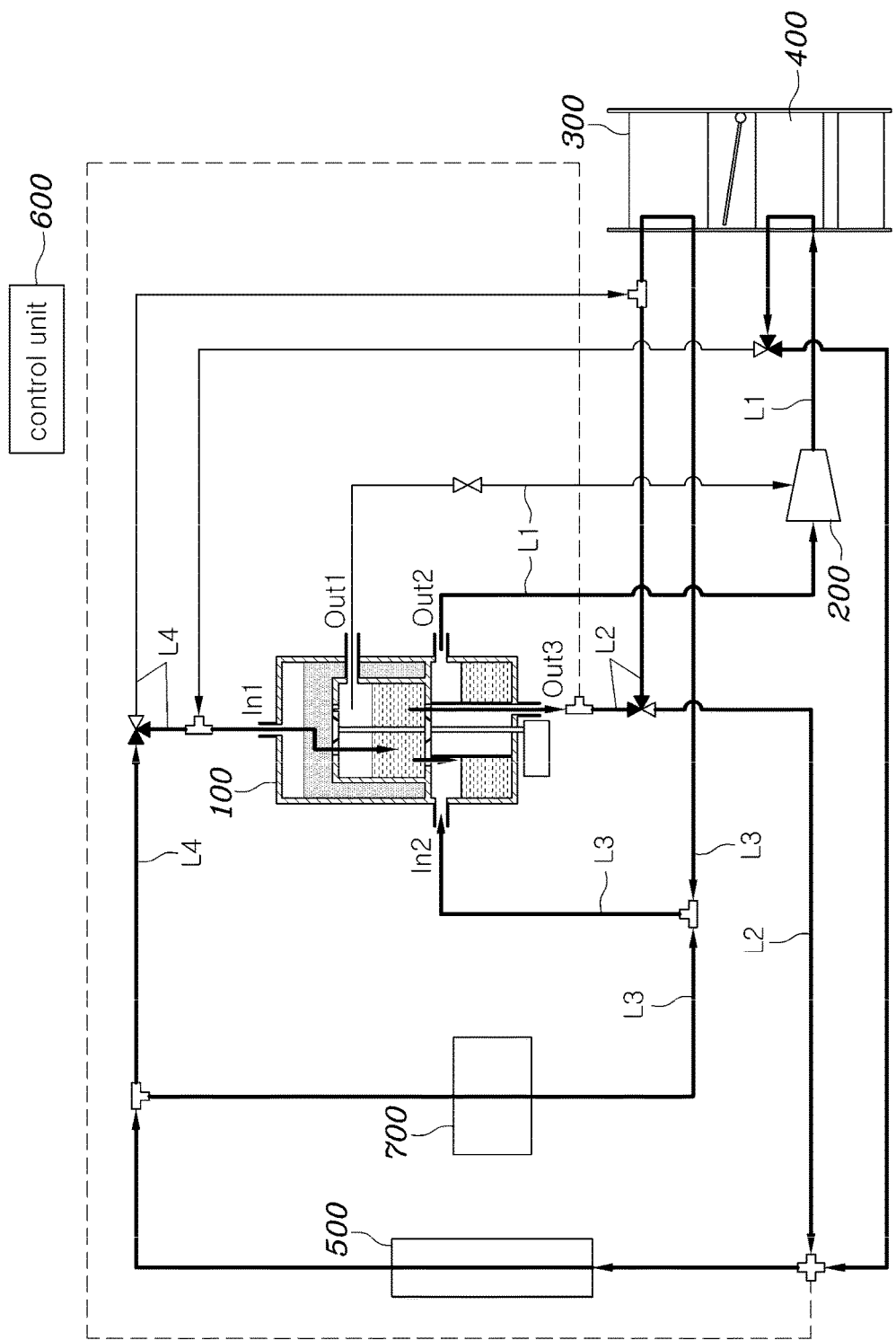

FIGS. 15 and 16 show an operation mode of the heat management system for the vehicle to which the injection type heat exchange module 100 according to the exemplary embodiment of the present disclosure is applied.

Further referring to FIG. 15, in the gas injection mode, the control unit 600 may control the actuator 150 so that the first valve 130 expands the refrigerant of the upper chamber 111 of the outer tank 110 into the inner tank 120 and the second valve 140 expands the refrigerant inside the inner tank 120 to the evaporator 300 through the cooling hole 122 communicating with the evaporator 300.

In other words, in the gas injection mode, the refrigerant may be expanded in the fixing hole 121 of the upper end of the inner tank 120 through the first valve 130, and at the same time, the refrigerant may be expanded in the cooling hole 122 of the lower end of the inner tank 120 through the second valve 140.

In addition, further referring to FIG. 16, in the liquid injection mode, the control unit 600 may control the actuator 150 so that the first valve 130 flows the refrigerant of the upper chamber 111 of the outer tank 110 into the inner tank 120, and the second valve 140 simultaneously expands the refrigerant inside the inner tank 120 to the lower chamber 112 of the outer tank 110 and the evaporator 300 through the injection hole 123 communicating with the lower chamber 112 of the outer tank 110 and the cooling hole 122 communicating with the evaporator 300.

In other words, in the liquid injection mode, the refrigerant may flow in the fixing hole 121 of the upper end of the inner tank 120 through the first valve 130, and at the same time, the refrigerant may be expanded in the injection hole 123 and the cooling hole 122 of the lower end of the inner tank 120 through the second valve 140.

Figure 17:
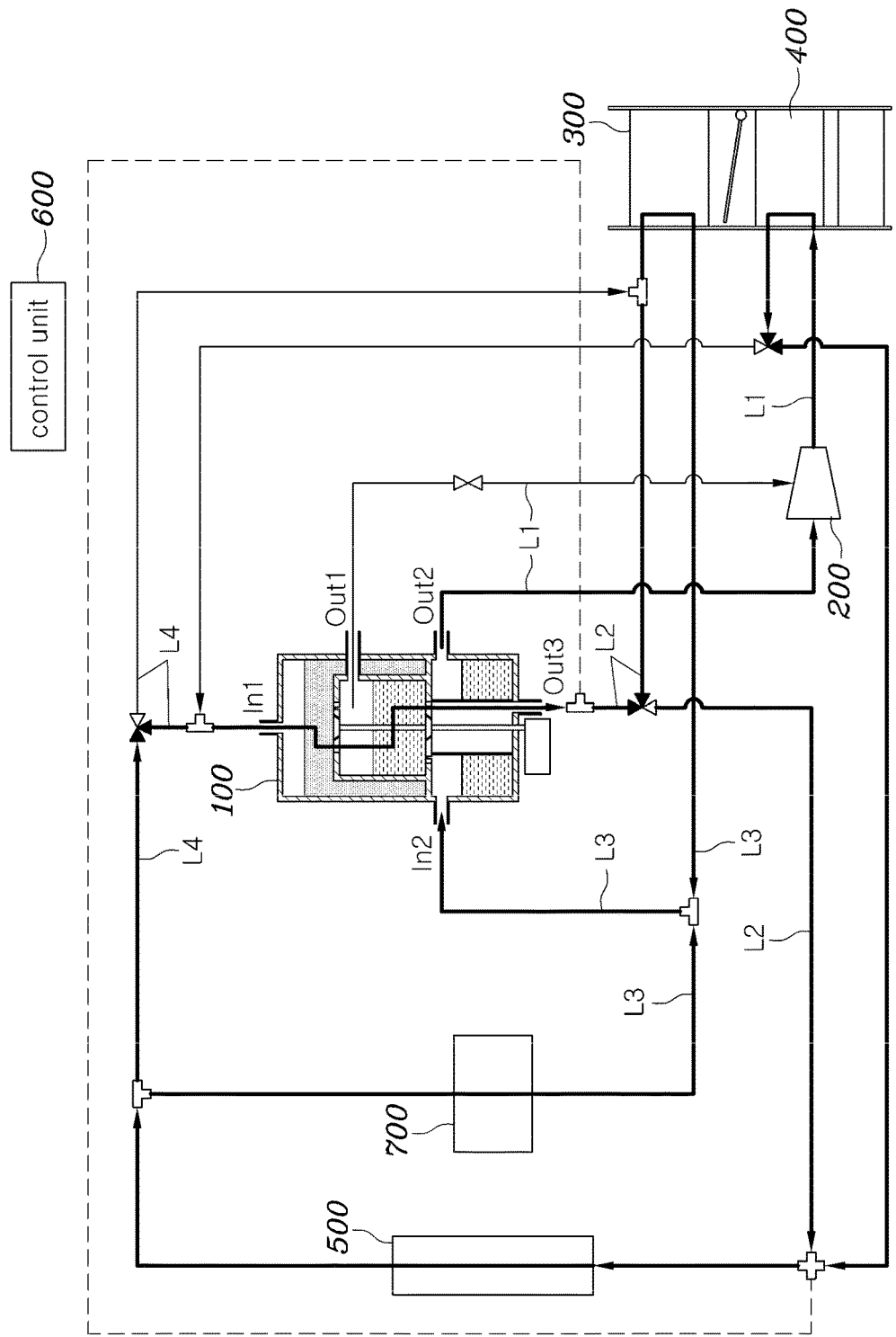
FIG. 17 shows an operation in the general refrigeration mode of heat management system for the vehicle to which the injection type heat exchange module according to the exemplary embodiment of the present disclosure is applied.

FIG. 17 shows an operation in the general refrigeration cycle of heat management system for the vehicle to which the injection type heat exchange module according to an embodiment of the present disclosure is applied.

Referring to FIG. 17, in the general refrigeration mode, the control unit 600 may control the actuator 150 so that the first valve 130 flows the refrigerant of the upper chamber 111 of the outer tank 110 into the inner tank 120, and the second valve 140 simultaneously expands the refrigerant through the cooling hole 122 communicating with the evaporator 300.

In other words, in the general refrigeration mode, the refrigerant may flow in the fixing hole 121 of the upper end of the inner tank 120 through the first valve 130, and at the same time, the refrigerant may be expanded in the cooling hole 122 of the lower end of the inner tank 120 through the second valve 140, and the injection hole 123 may be closed.

Although the specific exemplary embodiments of the present disclosure have been shown and described, it will be apparent to those skilled in the art that the present disclosure may be variously improved and changed without departing from the technical spirit of the present disclosure provided by the appended claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An injection type heat exchange module comprising:
   an outer tank comprising an upper chamber and a lower chamber separated from each other, the upper chamber configured to allow a refrigerant to be introduced from an outer condenser or an inner condenser, and the lower chamber being configured to allow the refrigerant to be introduced from an evaporator and to discharge the refrigerant to a compressor;
   an inner tank positioned inside the upper chamber of the outer tank to be heat-exchangeable with the refrigerant, and connected to discharge the refrigerant to the compressor, the evaporator, or the lower chamber of the outer tank;
   a first valve positioned on an upper end of the inner tank, the first valve being configured to rotate to expand or flow the refrigerant of the upper chamber of the outer tank into the inner tank, or block the flow of the refrigerant into the inner tank as the first valve rotates;
   a second valve rotatably coupled to a lower end of the inner tank, the second valve being configured to rotate to expand or flow the refrigerant inside the inner tank to the evaporator, or to block the flow of the refrigerant into the evaporator, and simultaneously expand the refrigerant into the lower chamber of the outer tank or block the flow of the refrigerant into the lower chamber of the outer tank as the second valve rotates; and an actuator simultaneously connected to the first valve and the second valve, the actuator being configured to simultaneously rotate the first valve and the second valve.

2. The injection type heat exchange module of claim 1, wherein the inner tank having an enlarged surface area of at least a part of an outer surface.

3. The injection type heat exchange module of claim 1, wherein the inner tank has an upper portion connected to the compressor so that a gaseous refrigerant is discharged into the compressor, and the inner tank has a lower portion connected to the evaporator so that a liquid refrigerant is discharged into the evaporator or the lower chamber of the outer tank.

4. The injection type heat exchange module of claim 1, wherein the lower chamber of the outer tank has an upper portion connected to the compressor so that a gaseous refrigerant is discharged into the compressor.

5. The injection type heat exchange module of claim 1,
wherein the first valve comprises a rotation wing hole and a rotation flow hole;
wherein the upper end of the inner tank comprises a fixing hole; and
wherein a position between the rotation wing hole, the rotation flow hole, and the fixing hole is changed as the first valve is rotated with respect to the inner tank.

6. The injection type heat exchange module of claim 1, wherein the second valve comprises a rotation wing hole and a rotation expansion hole;
wherein the lower end of the inner tank comprises an injection hole communicating with the lower chamber of the outer tank and a cooling hole communicating with the evaporator; and
wherein a position between the rotation wing hole and the rotation expansion hole, and a position between the injection hole and cooling hole are changed as the second valve is rotated with respect to the inner tank.

7. The injection type of heat exchange module of claim 5, wherein the rotation wing hole extends in a circumferential direction of the first valve or the second valve, and wherein the rotation wing hole has a shape of an enlarged or reduced open area as the rotation wing hole extends.

8. The injection type heat exchange module of claim 1, wherein the second valve simultaneously expands the refrigerant inside the inner tank to the lower chamber of the outer tank and the evaporator through an injection hole communicating with the lower chamber of the outer tank and a cooling hole communicating with the evaporator, expands the refrigerant into the lower chamber of the outer tank, flows the refrigerant into the evaporator, or simultaneously blocks the flow of the refrigerant into the lower chamber of the outer tank and the evaporator at a position where the first valve flows the refrigerant of the upper chamber of the outer chamber into the inner tank.

9. The injection type heat exchange module of claim 1, wherein the second valve expands the refrigerant inside the inner tank to the evaporator through a cooling hole communicating with the evaporator, or expands the refrigerant into the lower chamber of the outer tank through an injection hole communicating with the lower chamber of the outer tank at a position where the first valve expands the refrigerant of the upper chamber of the outer tank into the inner tank.

10. A heat management system for a vehicle to which the injection type heat exchange module of claim 1 is applied, the system comprising:
a first refrigerant line through which refrigerant flows from the inner tank and the lower chamber of the outer tank into the inner condenser through the compressor;
a second refrigerant line branched from the inner tank into the evaporator and the outer condenser and configured to have the refrigerant flow therethrough;
a third refrigerant line through which the refrigerant flows from a chiller or the evaporator into the lower chamber of the outer tank; and
a fourth refrigerant line through which the refrigerant flows from the outer condenser and the inner condenser into the upper chamber of the outer tank.

11. The system of claim 10, further comprising: a control unit configured to control an operation of the compressor and to control the rotation of the actuator so that the first valve and the second valve expand, flow, or block the refrigerant.

12. The system of claim 11, wherein in a gas injection mode, the control unit controls the actuator so that the first valve expands the refrigerant of the upper chamber of the outer tank into the inner tank, and the second valve expands the refrigerant inside the inner tank into the evaporator through a cooling hole communicating with the evaporator.

13. The system of claim 11, wherein in a liquid injection mode, the control unit controls the actuator so that the first valve flows the refrigerant of the upper chamber of the outer tank into the inner tank, and the second valve simultaneously expands the refrigerant inside the inner tank into the lower chamber of the outer tank and the evaporator through an injection hole communicating with the lower chamber of the outer tank and a cooling hole communicating with the evaporator.

* * * * *